US012766628B2

(12) United States Patent
Olsson

(10) Patent No.: US 12,766,628 B2
(45) Date of Patent: Oct. 20, 2026

(54) RESISTANCE MULTI PURPOSE WELDER ATTACHMENT

(71) Applicant: Joran Olsson, Carlsbad, CA (US)

(72) Inventor: Joran Olsson, Carlsbad, CA (US)

( * ) Notice: Subject to any disclaimer, the term of this patent is extended or adjusted under 35 U.S.C. 154(b) by 845 days.

(21) Appl. No.: 17/977,657

(22) Filed: Oct. 31, 2022

(65) Prior Publication Data

US 2023/0050221 A1 Feb. 16, 2023

Related U.S. Application Data

(63) Continuation of application No. 16/771,071, filed as application No. PCT/US2020/036690 on Jun. 8, 2020, now Pat. No. 11,484,964.

(60) Provisional application No. 62/858,237, filed on Jun. 6, 2019.

(51) Int. Cl.

| | |
|---|---|
| ***B23K 11/11*** | (2006.01) |
| ***B23K 11/28*** | (2006.01) |
| ***B23K 11/30*** | (2006.01) |
| ***B23K 11/31*** | (2006.01) |

(52) U.S. Cl.

CPC ............. *B23K 11/115* (2013.01); *B23K 11/28* (2013.01); *B23K 11/3018* (2013.01); *B23K 11/314* (2013.01)

(58) Field of Classification Search

CPC .... B23K 11/11–115; B23K 11/28–312; B23K 11/314–315; B23K 11/317; B23K 11/318; B23K 11/36–366

See application file for complete search history.

(56) References Cited

U.S. PATENT DOCUMENTS 5,783,792 A * 7/1998 Murakawa ........... B23K 11/314 219/86.1

6,706,990 B1 * 3/2004 Olsson ................. B23K 11/314 219/90

* cited by examiner

*Primary Examiner* — Hung D Nguyen

(74) *Attorney, Agent, or Firm* — Donn K. Harms

(57) ABSTRACT

A resistance welding device is configured for use in combination with a resistance welder having a translating welding electrode. A first arm of the welding device is in a translating rotational engagement with a second arm thereof. The first arm of the device is engageable to a translating electrode from the resistance welder. Translation of the welding electrode of the resistance welder moves first and second electrodes to contact metal therebetween and spot weld the metal.

17 Claims, 4 Drawing Sheets

RESISTANCE MULTI PURPOSE WELDER ATTACHMENT

FIELD OF THE INVENTION

This application is a Continuing patent application to U.S. patent application Ser. No. 16/771,071, filed on Jun. 9, 2020, which claims priority to U.S. Provisional patent application Ser. No. 62/858,237 filed on Jun. 6, 2019, both of which are included herein in their entirety by this reference thereto.

The disclosed device relates to the field of resistance welding more commonly known as spot welding. More particularly, this invention relates to a spot welding device which compresses and welds adjacent metal layers which are sandwiched between two electrodes at a compression point by a force communicated from a translating powered welder electrode. The force imparted by the two electrodes at the compression point of the device herein is substantially equal to the force communicated by the powered welder electrode. Fluid cooling provides a means to cool the electrodes during operation.

BACKGROUND OF THE INVENTION

Spot welding or resistance welding is a common manufacturing procedure of permanently engaging points upon two or more pieces of metal material through the formation of a spot weld at a point of contact between two electrodes or compression points. Prior to communication of electric current to the two electrodes positioned on opposite sides of the metal layers to be welded, force is applied to one of the electrodes to compress it upon the metal directly opposite the second electrode positioned on the opposite side of the metal layers at the compression point.

Once the metal layers are in a sandwiched engagement in between the two opposing compressing electrodes, electric current is communicated to one of the electrodes which travels through the metal layers at the compression point and onto the second electrode. This electric current is communicated at significant amperage for a period of time whereupon resistance from the metal material positioned between the electrodes generates heat sufficient to melt and weld the metal layers or material permanently.

This type of spot welding method and apparatus is widely used in manufacturing and automotive industries and requires no filler metal or flux during the welding process. In modern automotive manufacturing, a significant amount of the assembly of metal parts is accomplished with spot welding guns operated by robotic arms. In automotive repair, the same spot welding procedure is employed using components allowing for the portable positioning of the electrodes involved in welding.

There are two main parts of the tooling system for such spot welding, the features of which fundamentally influence the whole process. First is the gun and its type, and the second is the size and shape of the electrode. In such applications, where the gun layout should be as rigid as possible due to the high applying forces (e.g. welding of thick materials), the C-type gun is widely used. As well as the high resulting rigidity, this arrangement leads to a high tooling flexibility, as the motion of the electrodes is collinear.

Unlike the C-type, the so-called X-type arrangement provides less rigidity. However, because the members holding the two electrodes are engaged at a point to yield an X configuration, the space between the two electrodes may be larger and the reachable workspace is far larger than with the C-type. The X-type configuration is very common, where thin and flat objects are being processed (e.g. manufacturing of floor pan or roof panel). However, this X-type configuration offers less flexibility in terms of tooling, because the paths of the two opposing and moving electrodes are not collinear.

The forgoing examples of related art and limitation related therewith are intended to be illustrative and not exclusive, and they do not imply any limitations on the invention described and claimed herein. Various limitations of the related art in spot welding will become apparent to those skilled in the art upon a reading and understanding of the specification below and the accompanying drawings.

SUMMARY OF THE INVENTION

In this description, any directional prepositions if employed, such as up, upwardly, down, downwardly, front, back, top, upper, bottom, lower, left, right and other such terms refer to the device or depictions as they may be oriented are for convenience only in describing such as it appears in the drawings. Such terms of direction and location are not intended to be limiting in any fashion or to imply that the device or method herein has to be used or positioned with graphics in any particular orientation. Further, if not otherwise defined, by the term substantially is meant plus or minus five percent.

The device herein disclosed describes a new and unique resistance welder multi-purpose attachment capable of operation during welding as a conventional C-formed hand held resistance welding tool, while providing a wider opening between the two electrodes in the manner of an X-type tool when in an open configuration.

The utility of such a wider initial opening of the device herein, is enabled by a novel engagement of the two supports for the electrodes forming a weld, in a sliding pivoting engagement which allows for movement of opposing electrodes toward each other, which allows for a wider opening as in an X-type spot welding device. However, the two electrodes upon contact with the opposing sides of the metal to be welded, does so in a collinear fashion of a C-type welder. This configuration provides the user with the utility of both the X and C type welders.

Thus, the multi-tool attachment spot welding device herein, when used in an operative engagement with a hand held welder or fixed spot welder, allows it to accomplish multiple tasks and to form welds in two directions even over elongated sheet metal wall surfaces. Additionally provided is a fluid cooling system using fluid circuits providing cooling fluid to both the electrodes, which provides cooling to the electrodes during use. It should be noted that the fluid cooling system can be employed also with conventual C-type or X-type spot welder attachments, and such is anticipated as within the scope of this patent.

The herein disclosed resistance welder multi-purpose attachment is adapted for removable operative engagement to a hand held resistance welder, or another welder having a powered translating welder electrode for carrying electric current. The device herein is adapted to engage such welders with an electrode conducting connector on a first moveable arm. In this engagement, the welder electrode, which communicates electric current from the hand held welder tool, translates under power such mechanical, hydraulic or pneumatic power, and thereby removably electrically engages with the electrode receptor positioned on the first arm. This pivoting first arm has a first electrode engaged thereon.

A second arm is grounded and has the second electrode engaged thereon in position to contact the first electrode during operation, and has a compression or other fixed position connector, such as a collar, positioned thereon. This connector such as a collar is in a location to hold the second arm in a fixed but removable engagement to a mounting position on a mounting area on the hand held resistance welder. Once the collar or yoke is tightened to an operative engagement on the resistance welder, is forms a ground and it is in a fixed position relative thereto. The welder electrode, which translates axially through the collar on the second arm when it is engaged with the hand held resistance welder, is insulated from any electric current communication with the collar or with the second arm. The connector may be other forms of fixed removable connection such as bolts, flanges, and the like, however the collar when engaged aligns the welder electrode with the conducting connector along a translation axis, and is currently preferred.

The first arm is in a pivoting engagement to the second arm. This first arm is also insulated from any electrical communication with the second arm since it will carry electric current when the welder electrode is energized. Unique to the device herein, this pivoting engagement employs a slot running diagonally through the first arm at an engagement end. This slot engages over an elongated bushing slidably positioned within the slot. This elongated bushing has an opening therethrough for positioning of a member such as bolt therethrough which is in fixed positioning on the second arm.

It is this sliding on the bushing within the diagonal slot, formed in the end of the first arm, that allows the device to achieve an open position similar to that of an X-type welder, and to translate to a closed position in a manner of a C-type welder. Thus, the user has the utility of a extra wide opening during engagement over metal to be spot welded. Subsequent movement of the first arm will then move along a path ending in a direct coaxial or aligned positioning. This positions the first electrode in alignment with the second electrode during operation to translate the first electrode toward the second electrode to form a sandwiched engagement with metal to be welded therebetween.

The elongated bushing is formed having a width in between two side edges running along two parallel sides of the bushing. Opposing curved portions of the bushing extend around opposite ends of the elongated bushing. The elongated slot formed in the first arm, which during movement of the welder electrode to move the first arm, provides a path to translate the bushing along the side edges of the bushing. The translation of the busing is enabled by the interior side edges of the formed slot, which are spaced apart to slidingly engage against both the side edges on the opposing sides of the bushing.

Currently, a length of the bushing from curved end to curved end L2, is 40-60 percent of the length L1 of the elongated slot from curved sidewall to curved sidewall. A current especially preferred mode of the device in the operative configuration herein has the length of the bushing L2, at 52-57 percent of the length of the slot L1. This configuration has been found in experimentation to provide for both a sliding and a rotation of the pivot, during opening and closing of the first arm and second arm to achieve the wide separation of the first and second electrodes.

The slot on the first arm operatively engaged with the bushing, translates along the bushing in reverse during closing. This aligns the first electrode and second electrode along a common contact axis prior to the full rotation of the first arm on the pivot point with the second arm. Thus, the contact surface of the first electrode engaged to the moving first arm, follows substantially an arc which aligns the first electrode with the second electrode prior to compressive contact with the metal therebetween.

The pivot point between the first arm and the second arm is isolated by an electric insulation material to prevent electrical communication between the first arm and second arm. For example, the elongated bushing may be formed on an insulating material such as a polymeric material, and electric insulating sections may be placed in between any potential contact surface areas on the interior side surfaces of the first arm with any interior sides of a recess to which it engages to the pivot.

An additional advantage of the disclosed device, having the translating rotating engagement between the first arm and the second arm at a pivot point, is the maintaining of a geometry between the components. As disclosed this translating and pivoting connection, maintains a 1:1 linear translation of the two electrodes toward each other. The disclosed connection also maintains a 1:1 force ratio of the contact between the first electrode with the second electrode during welding, relative to both the linear translation and the force "F" imparted by the operatively engaged translating welding electrode.

Thus, the force communicated from the translating electrode, connected to a pivoting mating electrode, is communicated to the first electrode at a 1:1 ratio. This insures that force chosen by the user to compress the chosen metal, between the first electrode and second electrode of the device, is substantially equal to the force communicated from the translating welder electrode. Thus, during use, varying the force communicated by the translating welder electrode to a chosen force "F" from the tool to which it is engaged will always communicate a substantially equal closing force at the contact and compression of the first electrode with the second electrode.

Further, because the linear movement of the driving actuator translating the welding electrode which rotates the first arm is at a 1:1 ratio relative to the linear movement of the first electrode toward the second electrode with both aligned. This allows for very accurate measurements of a width or thickness of metal placed therebetween. It additionally provides for extremely accurate measurements of compression thereof once placed therebetween. Thus, once the distance between the first and second electrode, when aligned and touching is zeroed or measured for zero, a subsequent linear movement by the driving actuator translating the welding electrodes can measure both the thickness of metal placed between the two first and second electrodes, and any collapse or compaction thereof during welding or continued force to compress the metal.

Also provided with the device is a cooling system employing flexible cooling tubes to communicate cooling fluid in a flow to and from the electrodes during use. Currently, flexible tubes are in sealed engagement with an axial conduit communicating to an opening at a distal end thereof adjacent the engagement of the first electrode to the first arm and the second electrode on the second arm. Fluid flows along a fluid pathway down the respective axial conduit on both the first and second arm and returns along a secondary path on both the first and second arm to an exit conduit carrying heat from the two electrodes with it. It should be noted that this cooling system can also be employed with conventional X-type and c-type welding tools to cool the electrodes during use and such is anticipated.

It is an object of this portable resistance welder attached tool which provides a wider X-type opening or gap between the two welding electrodes in an open position, and an aligned C-type contact of the two welding electrodes when moved to a sandwiched contact at a welding point therebetween.

It is a further object of this invention to provide such a welding tool which maintains the force of compression of the first electrode and second electrode in contact with metal at a welding point, at a 1:1 ratio to both the force and linear distance communicated by the translating welding electrode driven by the actuator.

An additional object is the provision of such a welding attachment which also includes cooling fluid circulation to cool the first electrode and second electrode during use.

These together with other objects and advantages which become subsequently apparent reside in the details of the construction and operation as more fully hereinafter described and claimed, reference being made to the accompanying drawings forming a part thereof, wherein like numerals refer to like parts throughout.

BRIEF DESCRIPTION OF THE DRAWINGS

The accompanying drawings which are incorporated in and form a part of this specification illustrate embodiments of the invention and together with the description serve to explain the principles of this invention.

DETAILED DESCRIPTION OF THE PREFERRED EMBODIMENTS

Figure 1:
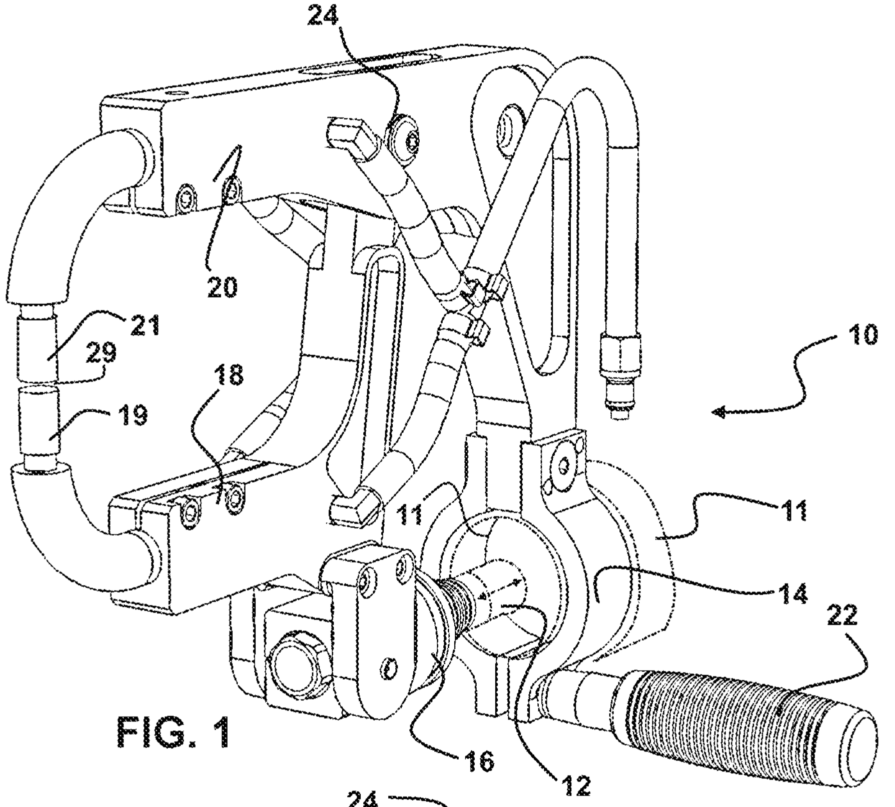
FIG. 1 depicts a perspective view of the disclosed resistance welder attachment device showing a translating welder electrode aligned axially and engaged with a connector such as a collar positioned on the second arm and the first and second electrodes aligned for compressive sandwiched engagement around metal placed therebetween, and fluid conduits employable for communicating a cooling fluid stream.
Figure 2:
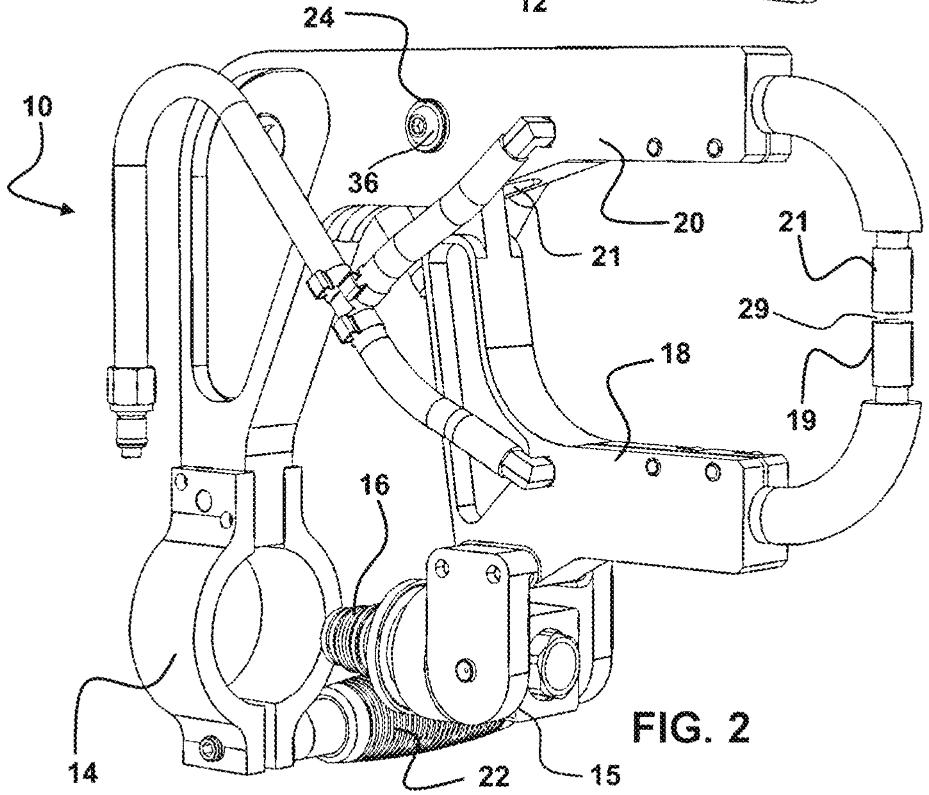
FIG. 2 depicts another reverse view of the device as shown in FIG. 1.

Referring now to the drawings of FIGS. 1-7, wherein similar parts of the invention are identified by like reference numerals. There is seen in FIGS. 1-2, the device 10 which is a portable resistance welder multi-purpose attachment device 10, which is configured for a removable fixed engagement to a hand held or similar welder 11 which has a translating welder electrode 12 in communication with electric current for welding. Such welders with translating welder electrodes 12 are well known and widely employed, such as for example and in no way limiting, the PS-500 or the I4S spot welder from ProSpot quality welding systems of Carlsbad, Calif.

Such handheld welders conventionally have a powered translating electrode 12 which is powered to move forward and reverse by hydraulic pressure, pneumatic pressure, or an electric drive such as for example a motor and worm gear. The term handheld welder 11 thus as used herein, means any welder which has controllable translating electrode 12 which may be energized with electrical current, which may be triggered by the user, to move toward and away from the second or fixed arm of the device 10, which is operatively connected to the hand held welder 11, thereby causing a pivoting movement of a pivoting or first arm. The pivoting movement causes electrodes on both arms to contact each other or move away from each other across a gap therebetween.

As shown, the translating welder electrode 12 removably engages with a conducting connector 16 which is in a rotational connection 15 to a first arm 18. This connector 16 is in electrical communication with a first electrode 19 engaged to the first arm 18 such as through the metal material forming the first arm 18 or through conducting wires or members.

A connector on the second arm 20 engages it to the welder 11, such as the depicted compressible collar 14 on the second arm 20 which is sized to achieve a compressive engagement upon the welder 11 used herewith. Other connectors may be employed so long as they form a fixed engagement and positioning of the second arm 20 with the welder 11.

As shown, with the connector provided by the collar 14 in such an engagement with a welder 11, the welder electrode 12 will translate through the collar 14 while in an engagement with the conducting connector 16. This welder electrode is insulated from any electrical contact with the collar 14. As noted, such translation of the welder electrode 12 is conventionally powered either mechanically or using hydraulic or electric power, to impart a force to translate the welder electrode 12. For ease of use, a tightener 22 or the like may be engaged to the collar 14 to be employed to form a compressive engagement of the collar 14 upon the welder 11 used herewith.

As noted, other connectors to form fixed connection of the second arm 20 to the welder 11 such as a bayonet or threaded engagement of the collar 14 with the first arm 20 may be employed or other connectors which hold the second arm 20 fixed position relative to the welder 11.

In operation as shown in FIG. 1 and the reverse view of FIG. 2, with the welder 11 removably engaged such as with the collar 14 thereon, and with the welder electrode 12 removably connected to the conducting connector 16, the translation of the welder electrode 12, in a direction toward the first electrode 19 and second electrode 21, causes them to move toward each other along a common axis aligned with the welding point.

Figure 6:
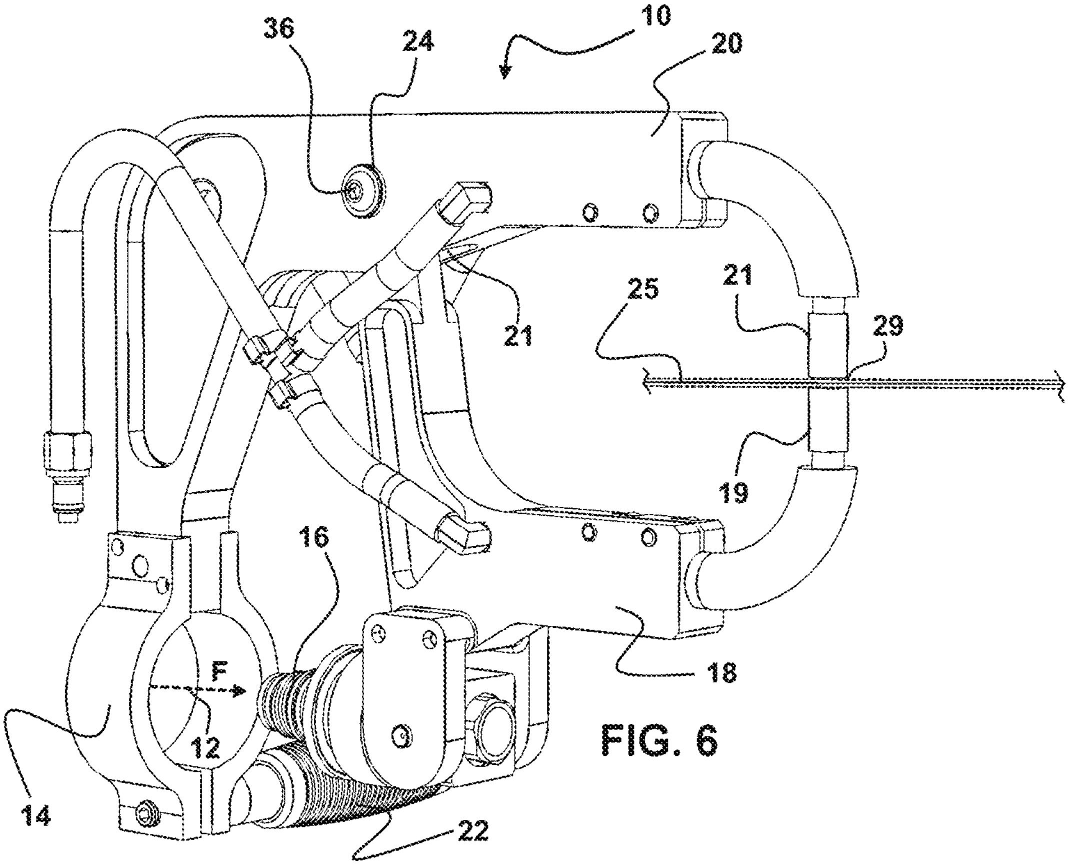
FIG. 6 depicts the device herein in similar fashion to that of FIG. 2 and shows the first arm rotated in the sliding pivoting engagement with the second arm to form a compressive contact with metal at the welding point, where the compression force between the two electrodes is substantially equal to the force F imparted by the translating welder electrode.

As noted, herein and shown below, the translating rotating engagement of the first arm 18 with the second arm 20 at a pivot point 24, such as on the second arm 20, maintains a 1:1 ratio of the force communicated from the translating welder electrode 12, to the compression of the first electrode 19 and second electrode 20 upon metal 25 therebetween as shown in FIG. 6.

By a translating rotating engagement at a pivot point 24 is meant that the pivot point 24 has an axle 36 fixed in position, such as in a passage 37 (FIG. 7), formed in one of the first arm 18 or second arm 20, and the axle 36, so fixed, communicates through a bushing 32, which is slidably engaged within a slot 30 formed in the other of the first arm 18 or second arm 20, where the bushing 32 has a length shorter than the length of the slot 30. Currently, the preferred configuration of this translating rotating engagement at the pivot point 24, is formed by the axle 36 being engaged through a passage 37 formed in the second arm 20, where that axle 36 is rotationally engaged through a bushing 32 which is slidably engaged within a slot 30 formed within an engagement end 17 of the first arm 18.

As noted, using this configuration, the distance of linear motion of the welder electrode 12 which is translated a distance by a driving actuator conventionally, will be at a 1:1 ratio and substantially equal to the distance of movement of the first electrode 19 toward the second electrode 21, when the two are aligned along the compressive axis 26 which as noted, occurs prior to contact of the first electrode 19 in any compressive contact with the metal 25. This 1:1 distance of movement, by calibrating the movement of the two electrodes from a zero point in contact with each other, allows for the measurement of thickness of the metal 25 located between the first and second electrodes 19 and 21.

Further, the 1:1 movement and equal force during such movement, also allows the use of a user determined force F (FIG. 6), at which to compress the first and second electrodes 19 and 21, in a sandwiched engagement at a welding point on the metal 25. This is done by adjusting the force F of the hydraulic, pneumatic, or mechanical device moving the welder electrode 12 against the conducting connector 16 and toward second arm 20 which is fixed to the welder 11.

Figure 3:
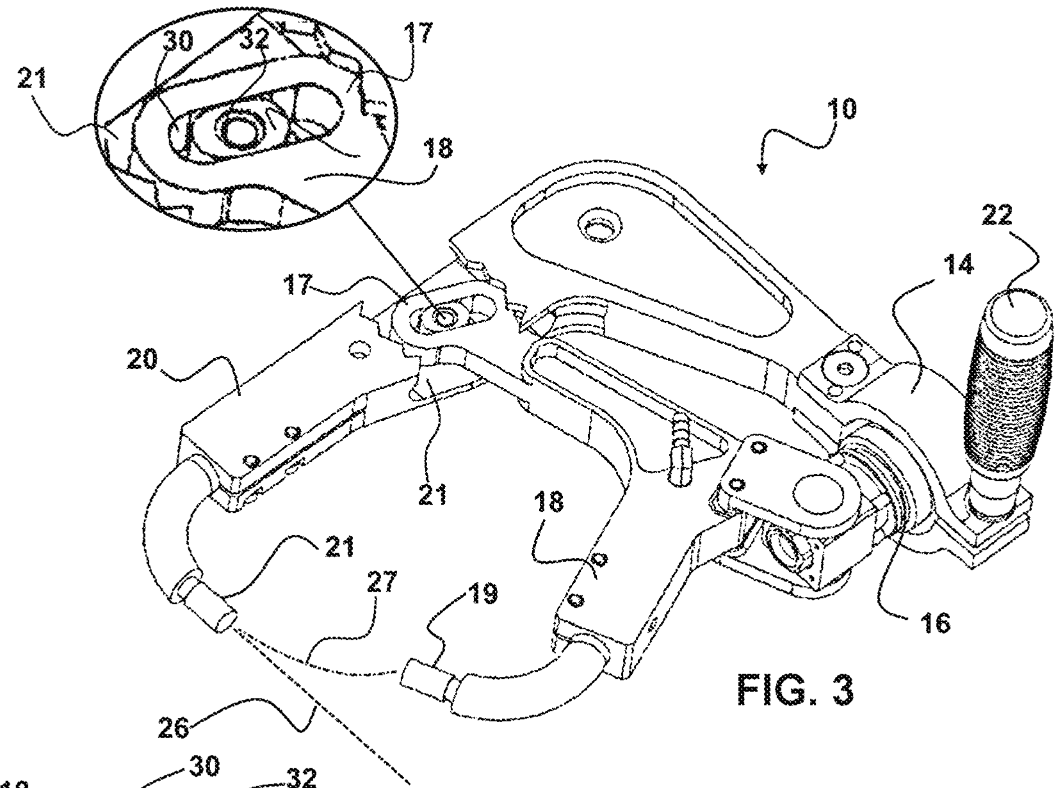
FIG. 3 depicts a side perspective view of the disclosed resistance welder tool device herein showing the device in a retracted or open configuration where the first arm has translated and rotated on the axle at the pivot point which is connected to a bushing within a slot in the an engagement end of the first arm.

It is this translating rotating engagement at the pivot point 24 which allows the device 10 herein to assume an open configuration, shown in FIG. 3, where the first electrode 19 is moved away and rearward with the first arm 18 at a retracted position, and out of alignment with the compression axis 26 and the second electrode 20. As noted, with the first arm 18 moved to this retracted position, it follows a curved pathway thereto and provides a wider first gap 27 between the first electrode 19 and second electrode 21, than if the first and second electrodes maintained their alignment along the electrode compression axis 26 where they align for compressive contact with metal 25 as in FIG. 6.

Translation of the welder electrode 12 in a direction moving away from the compression axis 26 while connected to the conducting connector 16, causes the first electrode 19 to follow this curved pathway shown along the dotted line defining the distance of the first gap 27, as the first arm 18 moves to the retracted position of FIG. 3. This curved pathway movement and formation of the wider first gap 27 between the first electrode 19 and second electrode 21 is enabled by the first arm 18 being in the translating rotating engagement at the pivot point 24, with said second arm 20.

Translation of the welder electrode 12 while connected to the conducting connector 16 in a second direction toward the compression axis 26, causes rotation and translation of the first arm 18 at the pivot point, and movement of the first electrode 19 along the curved pathway to a secondary position where the first electrode 19 aligns with the second electrode 21 along the compression axis 26, with a second gap 29 (FIG. 2) therebetween.

Figure 4:
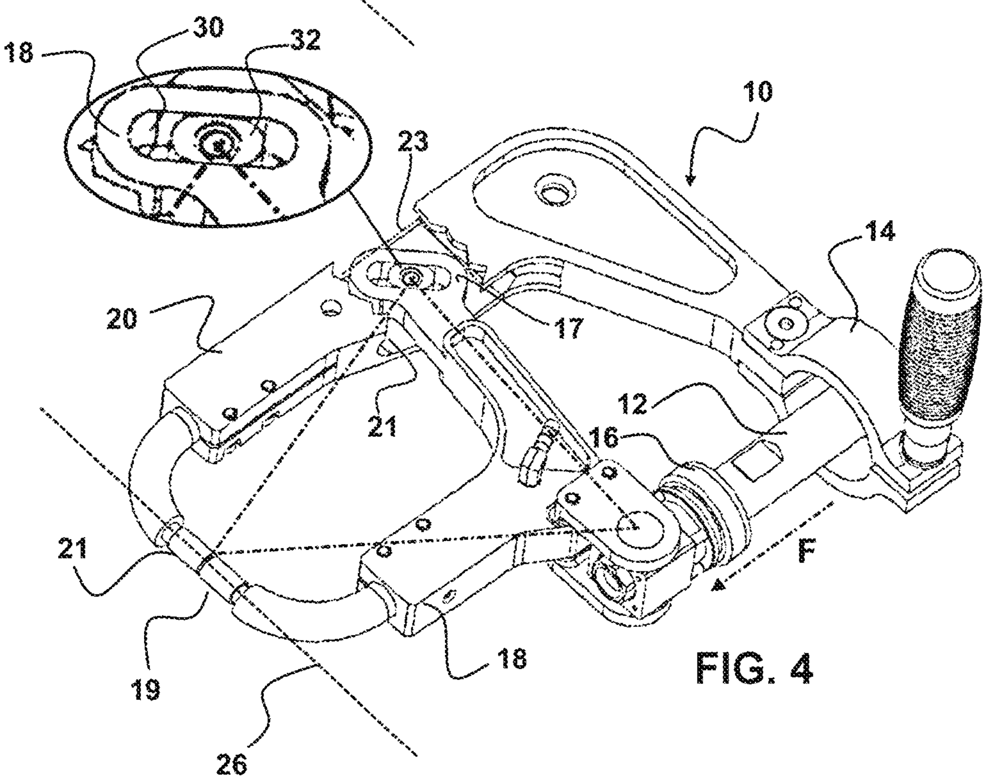
FIG. 4 depicts a side perspective view of the disclosed resistance welder tool device as in FIG. 3, but showing the device moved to a secondary configuration where the first arm has translated and rotated on the pivoting connection of the slot in the first arm with an elongated bushing, to position both the first electrode and second electrode in an axial alignment along a common contact axis, and showing the positioning of the components to yield a compression force therebetween at a 1:1 ratio to the force "F" of the translating welder electrode and the 1:1 ratio of linear movement to the movement of the first and second electrodes toward each other.

As shown in FIG. 4, where the welder conductor 12 has been translated under a force "F" in a direction toward the compression axis 26 of the two electrodes 19 and 21, the pivoting engagement of the first arm 18 to the second arm 20, has both translated and rotated in the connection at the pivot point 24 to the second arm 20. It is this pivot point 24 formed to provide this translating pivoting movement, which allows the first arm 18 to move from the retracted position to a secondary position aligning both the first electrode 19 with the second electrode 21 along the compression axis 26. In this alignment as shown such as in FIG. 1, which there is still a separation or second gap 29 or distance from contact between the first electrode 19 and second electrode 21. Thereafter, further movement of the welder electrode 12 toward the compression axis 26 will cause the first electrode 19 to travel along the compression axis 26 to contact and compress against the second electrode 21, at a welding point upon the metal 25 which is to be spot welded therebetween, such as shown in FIG. 6.

Further shown in FIG. 4, the pivot point 24 is configured to provide both the translating and rotating engagement of an engagement end 17 of the first arm 18 within a cavity 33 formed into the second arm 20. This translating rotating engagement at the pivot point 24 during operation of the device 10, positions the components to maintain a 1:1 force ratio relation between the force F, of the translating welder electrode 12, and the compression imparted to the metal 25 positioned between the first electrode 19 and second electrode 21 along the compressive axis 26.

In a graphic depiction of the relation of the components as shown, a substantially an equilateral triangle is formed which is depicted by the dotted lines, which run between the pivot point 24, a rotational connection 28 of the conducting connector 16 to the first arm 18, and the point of contact between the first and second electrodes 19 and 21. As noted, this relation is important during operation to allow the user to choose and maintain a mechanical force "F" which will equal the compression force of the two electrodes 19 and 21 on the metal 25 therebetween.

Figure 5:
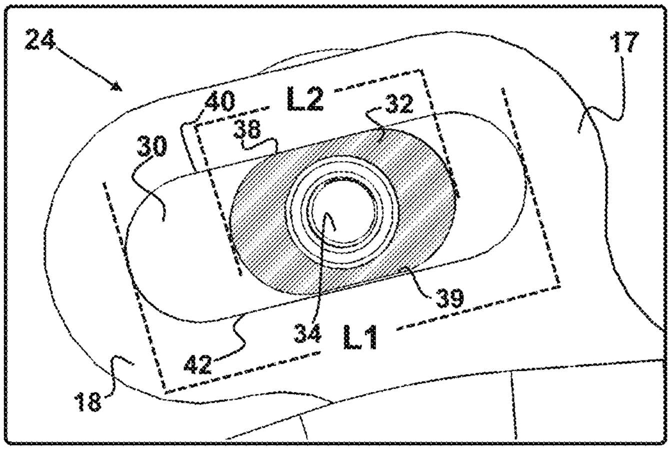
FIG. 5 is an enlarged view of the sliding rotational engagement located at the pivot point, between the first arm and the second arm, showing the elongated slot formed into the first arm slidably engaged on the insulating bushing, which is connected through an opening therein to an axle in fixed positioning on the second arm.

Shown in FIG. 5, is an enlarged view of the pivot point 24 configured as a translating and pivoting engagement between the first arm 18 and the second arm 20 at the pivot point 24 fixed on the second arm 20. As shown, an elongated slot 30 communicating through the engagement end 17 of the first arm 18 is slidably engaged upon a bushing 32. The bushing 32 is preferably formed of non electrically conductive material to maintain the first arm 18 electrically disconnected from the second arm 20. Additional insulating material 23 will be operatively positioned to either line the cavity 33 within the second arm 20, or be placed on the side surfaces of the first arm 18 in areas positioned within the cavity 33 formed in the second arm 20.

Figure 7:
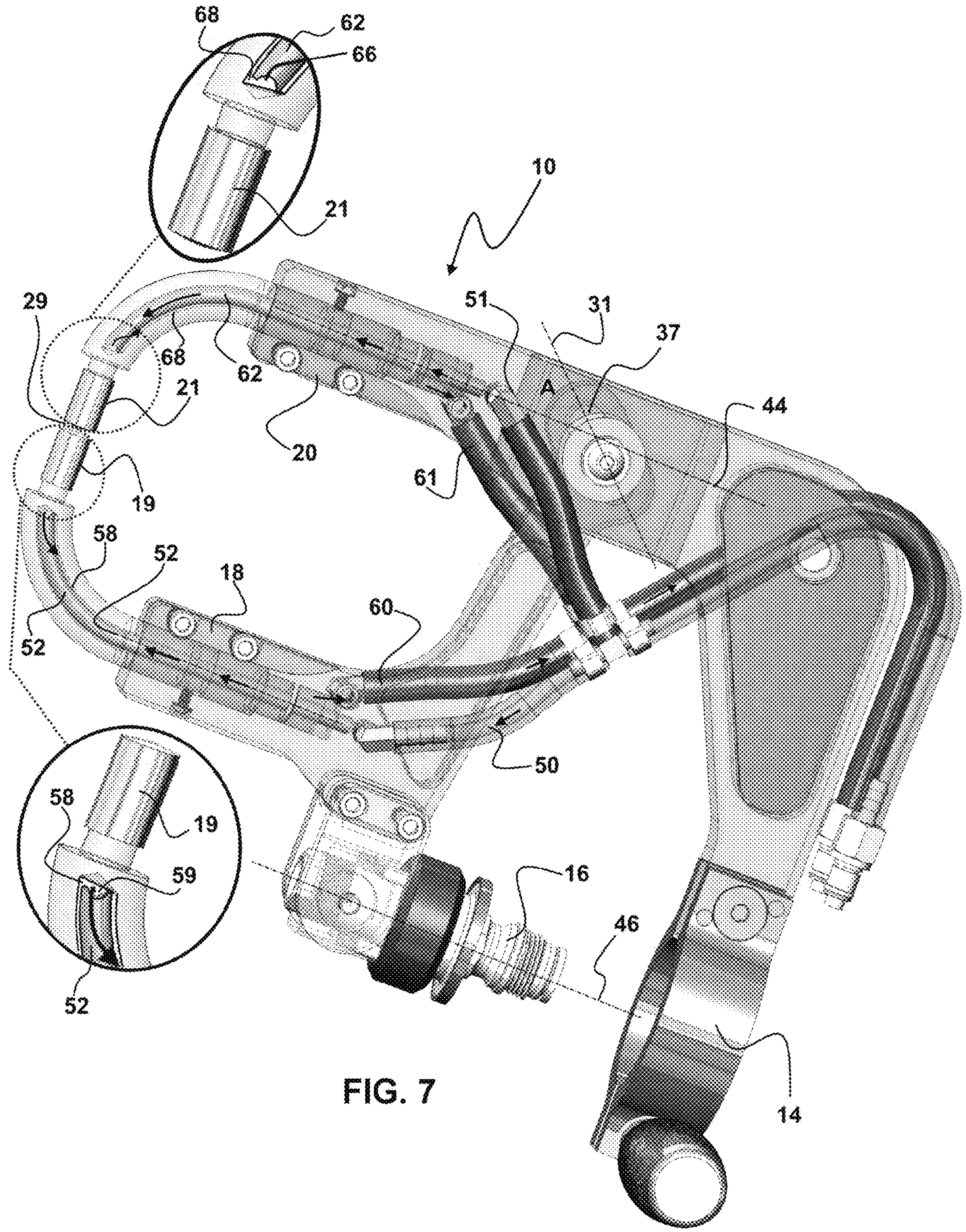
FIG. 7 depicts conduits for flow of cooling fluid along first and second cooling circuits, to carry heat from the first electrode and second electrode to cool them during use.

The bushing 32 as best shown in FIG. 5, has an opening 34 therethrough in which an axle 36, such as a bolt and nut engages (FIG. 6), and which holds the bushing 32 in a fixed position relative to the second arm 20. The slot 30 in the engagement end 17 of the first arm 18 will thus slide on opposing sides of the bushing 32, allowing the first arm 18 to slide in a direction along the slot axis 31 (FIG. 7). Further, the first arm 18 will rotate around the axle 36 when the bushing 32 rotates around the axle 36.

As shown, the bushing 32 has a length L2 between two ends of the bushing 32, which is substantially 40-60 percent of the length L1, of the elongated slot 30. A linear first sidewall portion 38 of the bushing 32 is substantially equal in length and runs parallel to a linear second sidewall portion 39 on the opposite side of the bushing 32. The slot 30 has a slot width determined by a spacing of a first side surface 40 and a second side surface 42. This slot width locates the first side surface 40 in a sliding contact against the first sidewall 38 of the bushing 38 and the second side surface 42 in a sliding contact against the second sidewall 38. The slot 30 may have curved ends which mirror in shape opposing curved ends of the bushing 32.

In use, an opening of the jaws of the device 10 by translation of the welder electrode 12 in a first direction, moves the first electrode 19 away from the second electrode 21 and moves the first arm 18, to the retracted position shown in FIG. 3. During this opening movement the first arm 18 slides in its engagement between the slot 30 therein with the bushing 32 in a first direction, while the bushing 32 concurrently rotates in a first direction around the axle 36. Thus the pivot point 24 provides for a translating and rotating engagement of the first arm 18, to the second arm 20 at the pivot point 24.

With the first arm 18 in the retracted position, when force F, is exerted to the engaged welder electrode 12 in an second direction to close the gap between the electrodes 19 and 21, to the configuration shown in FIG. 4, the translation of the welder electrode 12 at the force F, causes the first arm 18 to slide in its engagement of the slot 30 with the bushing 32 in the opposite direction. Concurrently, the first arm 18 and the bushing 32 rotate in an opposite direction from the first direction around the axle 36. This moves the first arm from the retracted position of FIG. 3, and positions the first electrode 19 back into an axial alignment with the second electrode 21 along the compressive axis 26, with the second gap 29 therebetween.

As shown in the transparent FIG. 7, the slot 30 in the first arm 18, runs along a slot axis 31 that is running at slot angle "A" of substantially 40 degrees relative to a second arm axis 44, running axially through the second arm 20. This second arm axis 44, runs substantially parallel to a translation axis 46. The translation axis 46 as shown, is the linear path followed by the translating welder electrode 12, when operatively engaged and connected to the conducting connector 16 and also runs axially through the conducting connector 16.

While the angle A of this slot axis 31 might change if components herein are changed in size, experimentation in forming the device 10 in many configurations which did not work as well, has shown that an axis angle between 30-50 degrees relative to the second arm axis 44 works well to provide the opening and closing features noted herein and such is preferred. Further, a slot axis 31 angle A between 38-42 degrees is especially preferred to allow for the sliding or translating rotating engagement of the pivot point 24 with the first arm 18.

In FIG. 7 is depicted the device 10 showing in transparent fashion to better depict the first fluid cooling circuit and the second fluid cooling circuit, to and through the device 10 which enable cooling of the two electrodes 19 and 21 during use.

As shown, a first cooling circuit is formed by a flexible incoming first fluid conduit 50, which communicates fluid to a first fluid pathway 52. This first fluid pathway 52 communicates the fluid to a first chamber 59, which forms a reversing point for the moving fluid adjacent to the first electrode 19. The fluid in the first chamber 59 forms a first heat sink which absorbs heat from the first electrode 19. The first chamber 59 is in sealed communication with a first return pathway 58, which communicates the heated now heated fluid to the exiting fluid conduit 60.

Also shown in FIG. 7, a similar configuration forms the second cooling circuit. This second cooling circuit cools the second electrode 21. Fluid from a flexible incoming fluid 51 communicates fluid to a second fluid pathway 62 which communicates the cooling fluid to a second chamber 66, adjacent the second electrode 21. The fluid in the second chamber 66 forms a second heat sink to absorb heat from the second electrode 21. Heated fluid in the second chamber 66 flows to a second return passage 68 which is in fluid communication with the second exiting fluid conduit 61.

As can be discerned cooling fluid circuits to and from the first chamber 59 adjacent the first electrode 19 and second chamber 66 adjacent the second electrode 21. Heat generated during welding from both electrodes, is communicated into the flowing fluid at the respective heat sinks formed by the first chamber 59 and second chamber 66, to thereby cool the electrodes. While the cooling circuits are shown employed with the device 10 herein, having a pivot point 24 forming the described translating and rotating engagement of the first arm 18 to the axle fixed on the second arm 20, it may also be employed with X-type and C-type spot welding tools which engage hand held welders 11 which have simple rotating engagement at the pivot point 24, and such is anticipated.

The device 10 shown in the drawings and described in detail herein disclose arrangements of elements of particular construction and configuration for illustrating preferred embodiments of structure and method of operation of the present invention. It is to be understood, however, that elements of different construction and configuration and other arrangements thereof, other than those illustrated and described, may be employed for providing a portable resistance welder multi-purpose attachment device in accordance with the spirit of this invention, and such changes, alternations and modifications as would occur to those skilled in the art are considered to be within the scope of this invention as broadly defined in the appended claims.

As such, while the present invention has been described herein with reference to particular embodiments thereof, a latitude of modifications, various changes and substitutions are intended in the foregoing disclosure, and will be appreciated that in some instance some features of the invention will be employed without a corresponding use of other features without departing from the scope of the invention as set forth in the following claims.

What is claimed is:

1. A resistance welding apparatus comprising:

a first arm having a connecting conductor engaged thereto, said connecting conductor for connecting said first arm to a translating welding electrode of a resistance welder;

said first arm having a first electrode connected thereto at a distal end, and having an engagement end, an elongated slot communicating through said engagement end of said first arm, the elongated slot having a slot axis;

a second arm, said second arm having a second electrode connected to a distal end thereof, said second arm having a second arm axis;

said first arm electrically insulated from said second arm;

said first arm in a rotating engagement at a pivot point, with said second arm;

said first arm having a retracted position wherein said first electrode is separated from said second electrode by a first gap;

said first arm having a secondary position wherein said first electrode and said second electrode align upon a compression axis and have a second gap therebetween;

said second gap for positioning of metal to be welded therein in a contact with both said first electrode and said second electrode;

a rotation of said first arm on said pivot point during translation of said welding electrode in a first direction along a translation axis, moving said first arm from said retracted position to said secondary position; and said first arm in said secondary position, communicating electric current from said welding electrode to said metal thereby forming a spot weld upon said metal inserted between said first electrode and said second electrode;

wherein said second arm axis is substantially parallel to said translation axis, and said slot axis is at an angle between 30-50 degrees relative to said second arm axis when said first arm is in said secondary position.

2. The resistance welding apparatus of claim 1 additionally comprising:

said first arm in a translating rotating engagement at said pivot point;

said first electrode running along a curved pathway during movement of said first arm from said retracted position to said secondary position;

said curved pathway defining a distance of said first gap; and said first gap being larger than said second gap.

3. The resistance welding apparatus of claim 2 wherein said first electrode is not aligned along said compression axis with said second electrode with said first arm in said retracted position.

4. The resistance welding apparatus of claim 3 wherein said translating rotating engagement at a pivot point of said first arm with said second arm comprises:

an axle engaged in a passage in said second arm;

an elongated bushing slidably located within said elongated slot;

said axle engaged through an opening in said elongated bushing; and whereby said first arm and said bushing rotate upon said axle and said bushing slides within said slot during movement of said first arm between said retracted position and said secondary position.

5. The resistance welding apparatus of claim 4 additionally comprising:

a distance of translation of said welding electrode is at a 1:1 ratio of a distance of travel of said first electrode toward said second electrode along said compression axis.

6. The resistance welding apparatus of claim 5 additionally comprising:

a force of said translation of said welding electrode toward said compression axis is at a 1:1 ratio to a force of said first electrode moving toward said second electrode along said compression axis.

7. The resistance welding apparatus of claim 3 additionally comprising:

a first fluid cooling circuit, said first cooling circuit communicating a first flow of cooling fluid through said first arm to a first cooling chamber adjacent said first electrode;

said first cooling chamber forming a first heat sink to draw heat from said first electrode;

a second fluid cooling circuit, said second cooling circuit communicating a second flow of cooling fluid through said second arm to a second cooling chamber adjacent said second electrode; and said second cooling chamber forming a second heat sink to draw heat from said second electrode.

8. The resistance welding apparatus of claim 2 wherein said translating rotating engagement at a pivot point of said first arm with second arm comprises:

an axle engaged in a passage in said second arm;

an elongated bushing slidably located within said elongated slot;

said axle engaged through an opening in said elongated bushing; and whereby said first arm and said bushing rotate upon said axle and said bushing slides within said slot during movement of said first arm between said retracted position and said secondary position.

9. The resistance welding apparatus of claim 8 additionally comprising:

a distance of translation of said welding electrode is at a 1:1 ratio of a distance of travel of said first electrode toward said second electrode along said compression axis.

10. The resistance welding apparatus of claim 9 additionally comprising:

a force of said translation of said welding electrode toward said compression axis is at a 1:1 ratio to a force of said first electrode moving toward said second electrode along said compression axis.

11. The resistance welding apparatus of claim 2 additionally comprising:

a first fluid cooling circuit, said first cooling circuit communicating a first flow of cooling fluid through said first arm to a first cooling chamber adjacent said first electrode;

said first cooling chamber forming a first heat sink to draw heat from said first electrode;

a second fluid cooling circuit, said second cooling circuit communicating a second flow of cooling fluid through said second arm to a second cooling chamber adjacent said second electrode; and said second cooling chamber forming a second heat sink to draw heat from said second electrode.

12. The resistance welding apparatus of claim 1 additionally comprising:

a first fluid cooling circuit, said first cooling circuit communicating a first flow of cooling fluid through said first arm to a first cooling chamber adjacent said first electrode;

said first cooling chamber forming a first heat sink to draw heat from said first electrode;

a second fluid cooling circuit, said second cooling circuit communicating a second flow of cooling fluid through said second arm to a second cooling chamber adjacent said second electrode; and said second cooling chamber forming a second heat sink to draw heat from said second electrode.

13. The resistance welding apparatus of claim 1, wherein said slot axis is at an angle between 38-42 degrees relative to said second arm axis.

14. A resistance welding apparatus comprising:

a first arm having a connecting conductor engaged thereto, said connecting conductor for connecting said first arm to a translating welding electrode of a resistance welder;

said first arm having a first electrode connected thereto at a distal end, and having an engagement end, an elongated slot communicating through said engagement end of said first arm, the elongated slot having a slot axis;

a second arm, said second arm having a second electrode connected to a distal end thereof, said second arm having a second arm axis;

said first arm in a rotating engagement at a pivot point, with said second arm;

said first arm having a retracted position wherein said first electrode is separated from said second electrode by a first gap;

said first arm having a secondary position wherein said first electrode and said second electrode align upon a compression axis and have a second gap therebetween;

said second gap for positioning of metal to be welded therein in a contact with both said first electrode and said second electrode;

a rotation of said first arm on said pivot point during translation of said welding electrode in a first direction along a translation axis, moving said first arm from said retracted position to said secondary position; and wherein said second arm axis is substantially parallel to said translation axis, and said slot axis is at an angle between 30-50 degrees relative to said second arm axis when said first arm is in said secondary position.

15. The resistance welding apparatus of claim 14, wherein said slot axis is at an angle between 38-42 degrees relative to said second arm axis.

16. The resistance welding apparatus of claim 14 wherein said translating rotating engagement at a pivot point of said first arm with said second arm comprises:

an axle engaged in a passage in said second arm;

an elongated bushing slidably located within said elongated slot;

said axle engaged through an opening in said elongated bushing; and whereby said first arm and said bushing rotate upon said axle and said bushing slides within said slot during movement of said first arm between said retracted position and said secondary position.

17. The resistance welding apparatus of claim 14 additionally comprising:

a first fluid cooling circuit, said first cooling circuit communicating a first flow of cooling fluid through said first arm to a first cooling chamber adjacent said first electrode;

said first cooling chamber forming a first heat sink to draw heat from said first electrode;

a second fluid cooling circuit, said second cooling circuit communicating a second flow of cooling fluid through said second arm to a second cooling chamber adjacent said second electrode; and said second cooling chamber forming a second heat sink to draw heat from said second electrode.

* * * * *